(12) United States Patent
Bangalore et al.

(10) Patent No.: US 9,805,026 B2
(45) Date of Patent: *Oct. 31, 2017

(54) ON-DEMAND LANGUAGE TRANSLATION FOR TELEVISION PROGRAMS

(71) Applicant: AT&T Intellectual Property II, L.P., Atlanta, GA (US)

(72) Inventors: Srinivas Bangalore, Morristown, NJ (US); David Crawford Gibbon, Lincroft, NJ (US); Mazin Gilbert, Warren, NJ (US); Patrick Guy Haffner, Atlantic Heights, NJ (US); Zhu Liu, Marlboro, NJ (US); Behzad Shahraray, Freehold, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/457,179

(22) Filed: Aug. 12, 2014

(65) Prior Publication Data

US 2014/0350915 A1 Nov. 27, 2014

Related U.S. Application Data

(63) Continuation of application No. 12/897,149, filed on Oct. 4, 2010, now Pat. No. 8,805,668, which is a continuation of application No. 11/424,330, filed on Jun. 15, 2006, now Pat. No. 7,809,549.

(51) Int. Cl.
*G06F 17/28* (2006.01)

(52) U.S. Cl.
CPC .................. *G06F 17/289* (2013.01)

(58) Field of Classification Search
CPC .... G06F 17/27; G06F 17/2705; G06F 17/275; G06F 17/28; G06F 17/2827; G06F 17/2836; G06F 17/2881; G06F 17/289
USPC ................. 704/2, 3, 8, 257, 277, 270, 270.1
See application file for complete search history.

(56) References Cited

U.S. PATENT DOCUMENTS

| | | | |
|---|---|---|---|
| 7,151,942 B1 * | 12/2006 | Evens | G06Q 30/02 340/7.41 |
| 7,711,543 B2 | 5/2010 | Bangalore et al. | |
| 2003/0046075 A1 | 3/2003 | Stone | |
| 2003/0093790 A1 | 5/2003 | Logan et al. | |
| 2003/0208352 A1 | 11/2003 | Lee | |
| 2003/0216922 A1 | 11/2003 | Gonzales et al. | |
| 2005/0162551 A1 | 7/2005 | Baker | |
| 2006/0136226 A1 | 6/2006 | Emam | |
| 2007/0174244 A1 | 7/2007 | Jones | |

* cited by examiner

*Primary Examiner* — Qi Han

(57) ABSTRACT

In an embodiment, a method of providing an on demand translation service is provided. A subscriber may be charged a reduced fee or no fee for use of the on demand translation service in exchange for displaying commercial messages to the subscriber, the commercial messages being selected based on subscriber information. A multimedia signal including information in a source language may be received. The information may be obtained as text in the source language from the multimedia signal. The text may be translated from the source language to a target language. Translated information, based on the translated text, may be transmitted to a processing device for presentation to the subscriber. The received multimedia signal may be sent to a multimedia device for viewing.

20 Claims, 5 Drawing Sheets

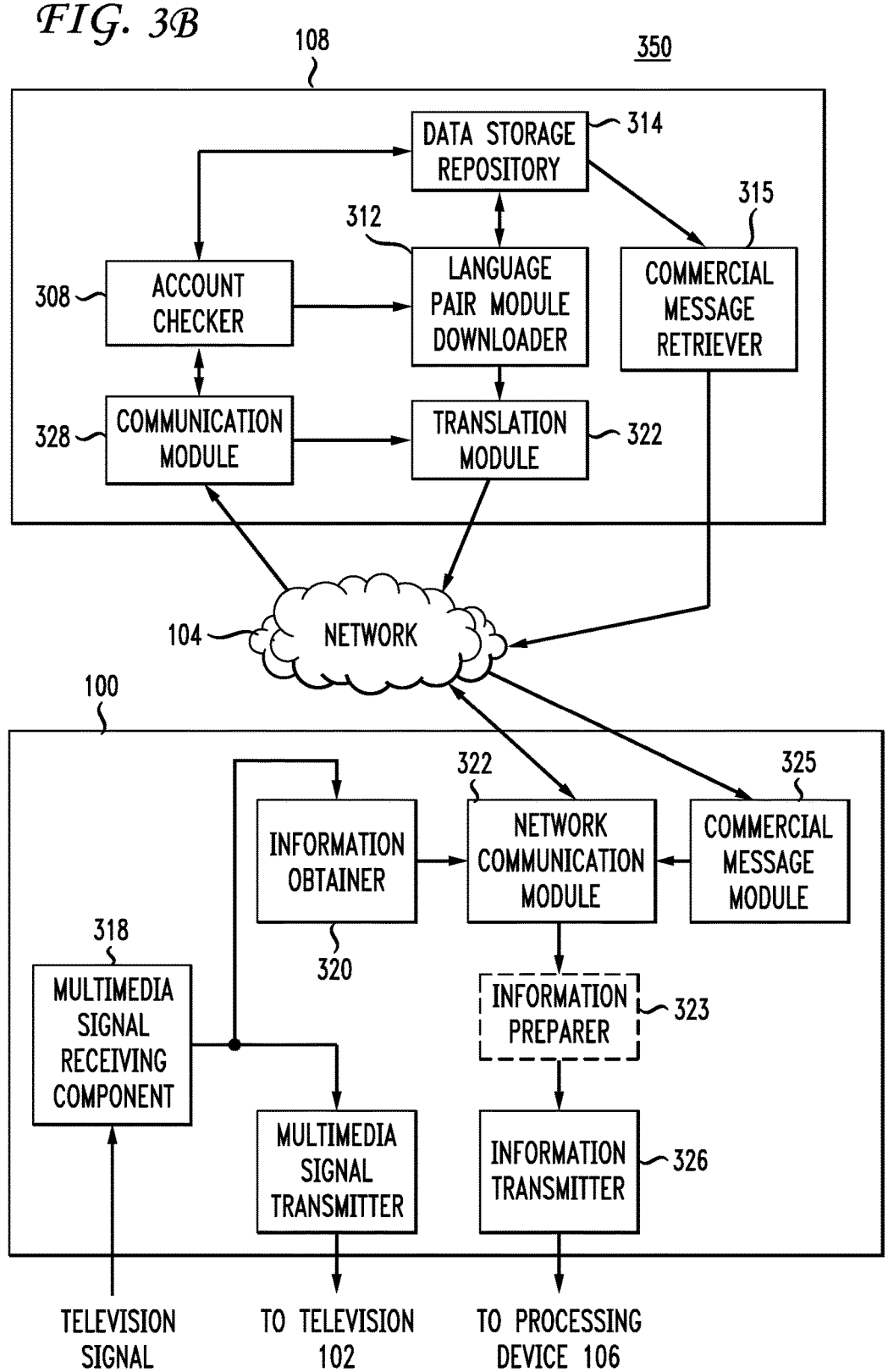

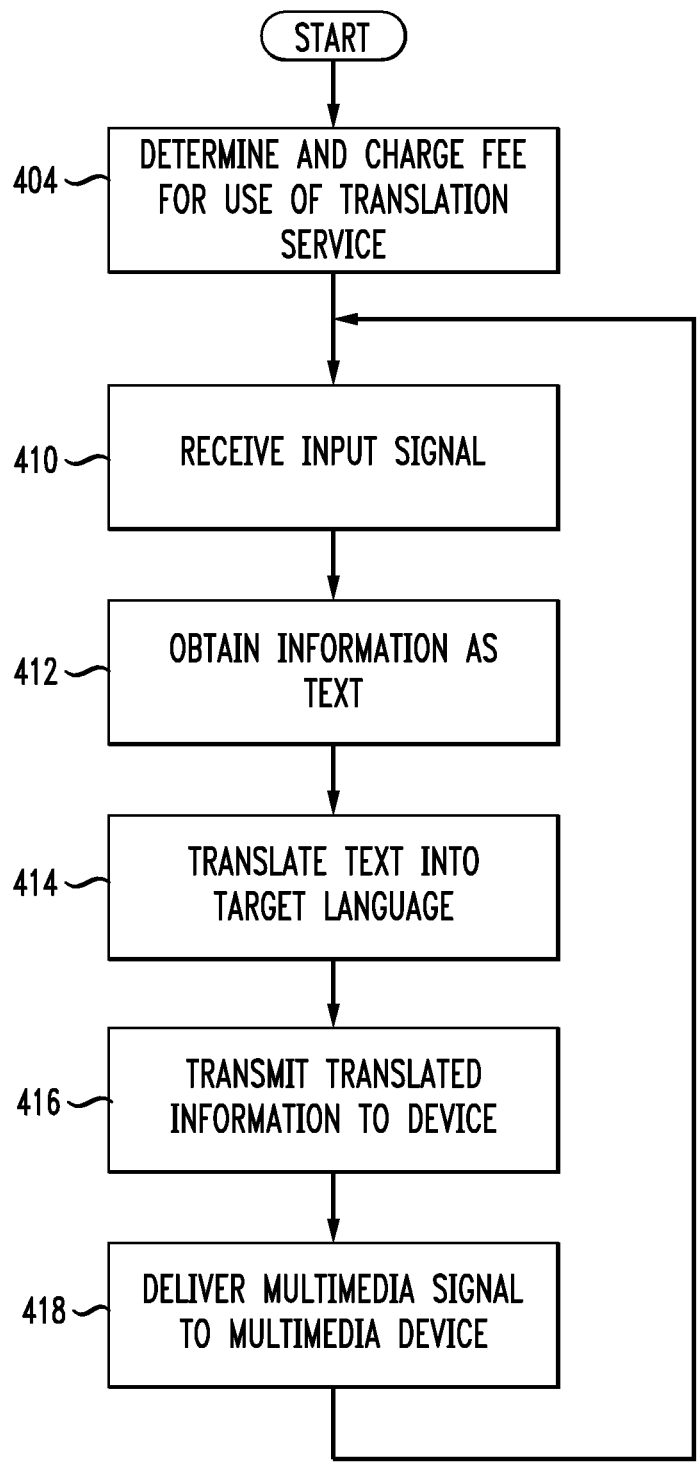

ON-DEMAND LANGUAGE TRANSLATION FOR TELEVISION PROGRAMS

PRIORITY INFORMATION

The present application is a continuation of U.S. patent Ser. No. 12/897,149, filed Oct. 4, 2010, which is a continuation of U.S. patent application Ser. No. 11/424,330, filed Jun. 15, 2006, now U.S. Pat. No. 7,809,549, issued Oct. 5, 2010, the content of which are included herewith in their entirety.

BACKGROUND OF THE INVENTION

1. Field of the Invention

The present invention relates to automatic language translation from a source language to a target language, and in particular to methods, systems, and machine-readable media for use in translating information from multimedia programs from a source language to a target language in real time.

2. Introduction

Anyone who has traveled to a foreign country, in which a language he or she understands is not spoken, has experienced a language barrier. A language barrier is also experienced by a newcomer to a country in which the native language is not known to the newcomer. Much news and entertainment is now received via television programs. People who do not understand a native language of a country or region are unable to obtain news or entertainment from media, such as local television programs. A service or device that makes television programs understandable to people who do not speak the local language is needed.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method for providing an on demand translation service may be provided. A subscriber may be charged a reduced fee or no fee for use of the on demand translation service in exchange for displaying commercial messages to the subscriber, the commercial messages being selected based on subscriber information. A multimedia signal including information in a source language may be received. The information may be obtained as text in the source language from the multimedia signal. The text may be translated from the source language to a target language. Translated information, based on the translated text, may be transmitted to a processing device for presentation to the subscriber. The received multimedia signal may be sent to a multimedia device for viewing.

Subscriber information may be any type of information associated with the subscriber. For example, it may be name, address, GPS location, preferred language, phone number or personal website data. The language that the subscriber chooses for translation may also be subscriber information. Other example information may be the substance of text that is to be translated which can provide clues to the interests of the subscriber, programs the subscriber is watching and so forth. In other words, any type of information that may provide data which can affect a decision of a more focused commercial or other messages may be considered subscriber information.

In a second aspect of the invention, a system for providing an on demand translation service may be provided. The system may include a multimedia signal receiving component, a speech recognizer, a translation module, an information transmitter, a multimedia signal transmitter, a commercial message retriever and a commercial message module. The multimedia signal receiving component may be configured to receive a multimedia signal having an audio portion, which may include speech in a source language. The speech recognizer may be configured to obtain the speech in the source language, from the audio portion, as text. The translation module may be configured to translate the text from the source language to a target language for the subscriber using one of a group of language pair modules. The information transmitter may be configured to receive information, based on the translated text, and to transmit the information to a first processing device for presentation to the subscriber. The multimedia signal transmitter may be configured to transmit the multimedia signal to a multimedia device for viewing. The commercial message retriever may select and obtain one or more commercial messages based on subscriber information. The commercial message module may receive the one or more commercial messages from the commercial message retriever for presentation to the subscriber.

In a third aspect of the invention, a machine-readable medium having recorded thereon instructions for at least one processor to provide an on demand translation service may be provided. The machine-readable medium may include instructions for charging a subscriber a reduced fee or no fee for use of the requested on demand translation service in exchange for displaying commercial messages to the subscriber, the commercial messages being selected based on subscriber information, instructions for receiving a multimedia signal including information in a source language, instructions for obtaining the information as text in the source language from the multimedia signal, instructions for translating the text from the source language to the target language, instructions for transmitting translated information based on the translated text to a processing device for presentation to the subscriber, and instructions for sending the received multimedia signal to a multimedia device for viewing.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 3A and 3B are functional block diagrams that illustrate embodiments of the invention;

FIGS. 4 through 5B are flowcharts that illustrates exemplary processes that may be used in implementations consistent with the principles of the invention.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Overview

Multimedia programs, such as, of example, television programs are broadcast with information in a source language. The information may be closed-captioning data for hearing-impaired television viewers, subtitles, speech, or other information. Implementations consistent with the principles of the invention may provide a service in which a television signal or other multimedia signal, including information in a source language, may be received. The information may be extracted from the multimedia signal as text and the text may be translated from a source language to a target language. Translated information from the text in the target language may be transmitted to a processing device, such as, for example, a portable processing device, such that viewers of the same multimedia program may receive translated information on their respective portable processing devices in their respective target languages while viewing the same multimedia program together. The translated information may be, for example, generated speech or textual information.

Exemplary on Demand Translation System

Figure 1:
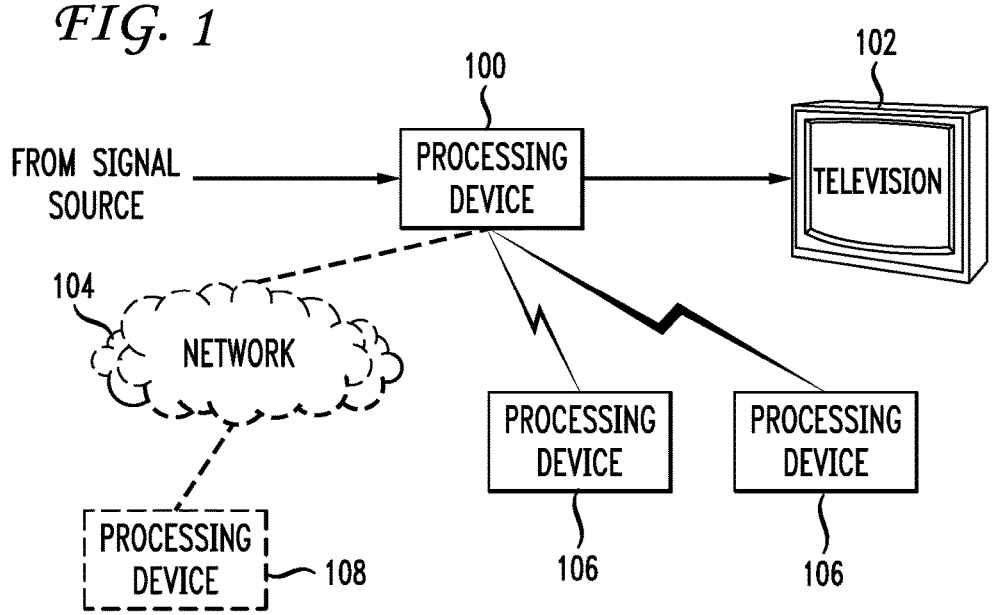
FIG. 1 illustrates an exemplary operating environment for a first embodiment of the invention.

FIG. 1 is a diagram illustrating an exemplary first embodiment of an on demand translation system for television programs. The exemplary system may include a processing device 100, a television 102, an optional network 104, one or more processing devices 106 and processing device 108.

Processing device 100 may receive multimedia signals, such as, for example, television signals from a signal source, which may include a television signal transmitter, a cable, a satellite, or another source. Processing device 100 may obtain information in a source language from the television signal, translate the information from a source language to a target language, transmit the translated information to one or more processing devices 106 and transmit the television signals to television 102 or another multimedia device, where the television program or multimedia program may be viewed.

In some implementations consistent with the principles of the invention, processing device 100 may require a language pair module for a language pair (source language/target language) of interest to a subscriber of the on demand translation service. A subscriber may send a request for a language pair module to processing device 108 via network 104. Network 104 may include one or more networks, such as the Internet, a local area network, a wide-area network, a Public-Switched Telephone Network (PSTN), an Ethernet network, an optical network, or other type of network.

Processing device 108 may access a data storage repository which may include the requested language pair module and, in one implementation, may download the language pair module to processing device 100. In another implementation, processing device 108 may install the requested language pair module into a local translation module for translating a source language to a target language.

In one implementation of the system of FIG. 1, processing device 100 may be a set-top box. Processing device 106 may be, for example, a laptop computer, a notebook computer, a Personal Digital Assistant (PDA) or other processing device.

Although the exemplary embodiment of FIG. 1 includes only one processing device 108 and only one processing device 100, other embodiments may include more or fewer processing devices. For example, an embodiment may include multiple processing devices 100, each having one or more associated processing devices 108. Further, embodiments may include one or more groups of processing devices 108, which may be arranged as one or more server farms.

Exemplary System

Figure 2:
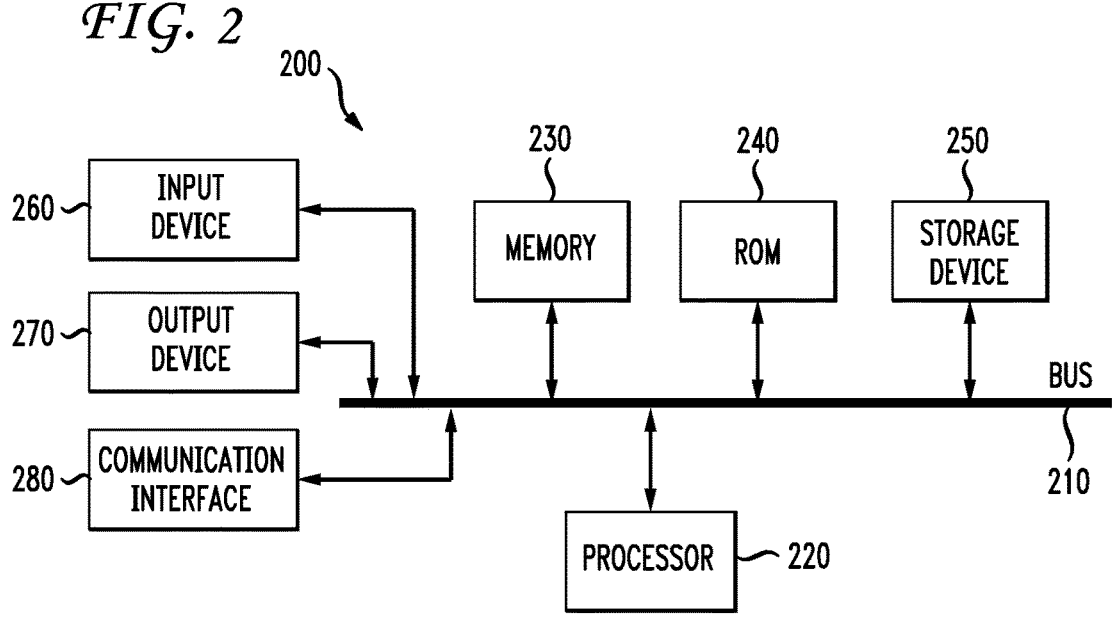
FIG. 2 is a functional block diagram of an exemplary processing system which may be used in implementations consistent with principles of the invention.

FIG. 2 illustrates an exemplary processing system 200 which may be used to implement processing devices 100, 106, or 108. Processing system 200 may include a bus 210, a processor 220, a memory 230, a read only memory (ROM) 240, a storage device 250, an input device 260, an output device 270, and a communication interface 280. Bus 210 may permit communication among the components of processing system 200.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive. In one implementation of processing device 108, storage device 250 may include a data storage repository for a number of language pair modules.

Input device 260 may include one or more conventional mechanisms that permit a user to input information to system 200, such as a keyboard, a mouse, a pen, a voice recognition device, a microphone, a headset, etc. Output device 270 may include one or more conventional mechanisms that output information to the user, including a display, a printer, one or more speakers, a headset, an earphone, or a medium, such as a memory, or a magnetic or optical disk and a corresponding disk drive. Communication interface 280 may include any transceiver-like mechanism that enables processing device 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections.

Processing system 200 may perform such functions in response to processor 220 executing sequences of instructions contained in a computer-readable medium, such as, for example, memory 230, a magnetic disk, or an optical disk.

Such instructions may be read into memory 230 from another computer-readable medium, such as storage device 250, or from a separate device via communication interface 280.

Processing system 200 may be, for example, a personal computer (PC), or any other type of processing device capable of processing textual or speech data. In alternative implementations, such as, for example, a distributed processing implementation, a group of processing devices 200 may communicate with one another via a network such that various processors may perform operations pertaining to different aspects of the particular implementation.

EMBODIMENTS OF THE INVENTION

Figure 3A:
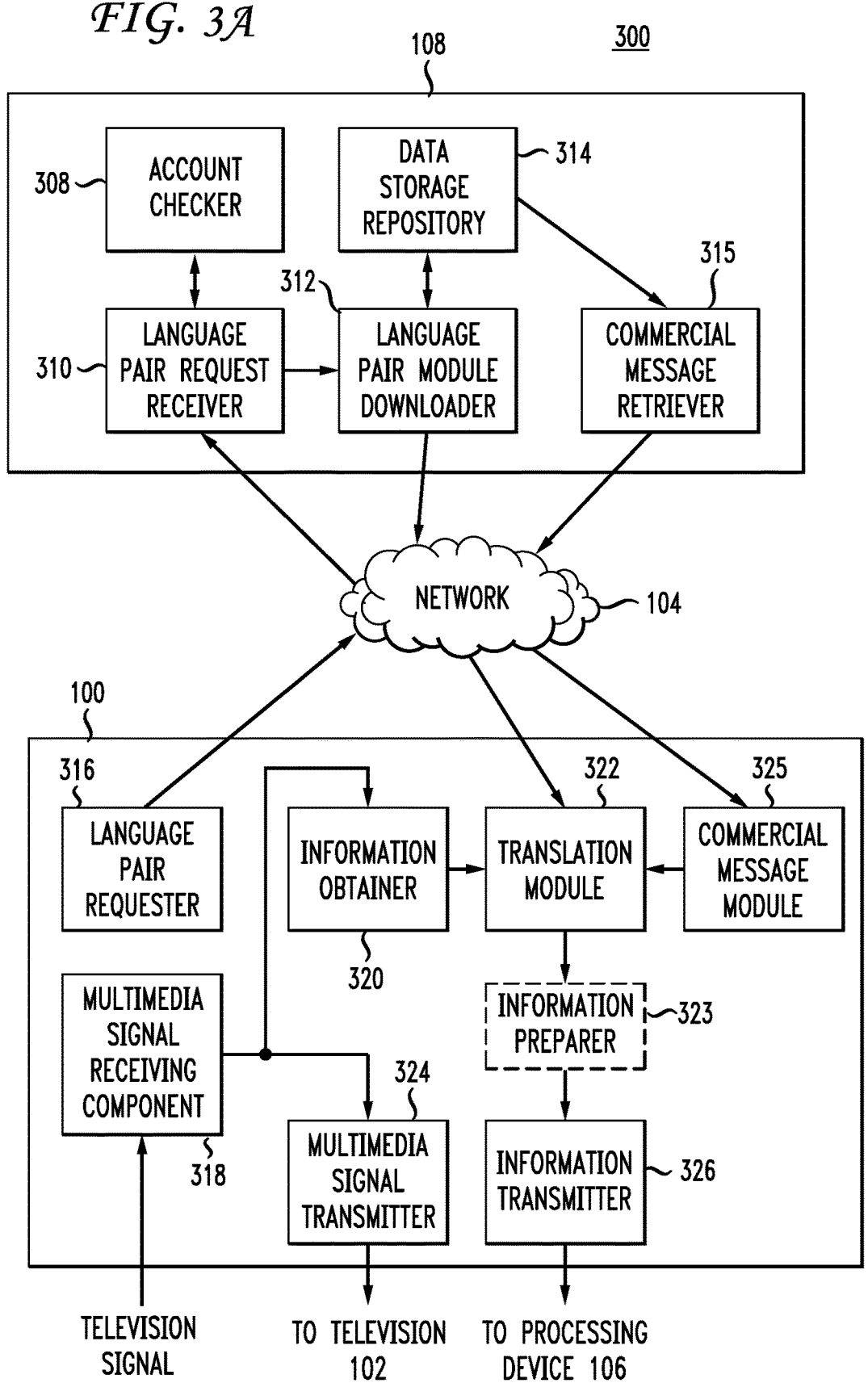

FIG. 3A illustrates a functional block diagram of an exemplary first embodiment 300 of the invention, shown in FIG. 1. Exemplary first embodiment 300 may include processing device 108, processing device 100, network 104 and one or more processing device(s) 106 (not shown in FIG. 3A). Processing device 108 may include an account checker 308, a language pair request receiver 310, a language pair module downloader 312 and a data storage repository 314. Processing device 100 may include a language pair requester 316, a multimedia signal receiving component 318, an information obtainer 320, a translation module 322, an optional information preparer module 323, a commercial message module 325, an information transmitter 326 and a multimedia signal transmitter 324.

Processing device 100 may be located locally with respect to television 102 or other multimedia device and processing device(s) 106. Processing device 100 may be a device that receives a multimedia signal and outputs a multimedia signal to television 102. Processing device 108 may be located remotely from television 102. Processing device 108 may have access to language pair modules for downloading to processing device 100 in exchange for a fee. For example, a subscriber may pay a periodic fee, such as monthly, weekly, semiannually, or other suitable periodic period, for use of one or more language pair modules. Alternatively, the subscriber may be permitted use of the one or more language pair modules for free in exchange for agreeing to receive commercial messages, which may be sent to television 102 or other multimedia device from processing device 100 or may be sent to processing device(s) 106 from processing device 100 for presentation to the subscriber.

Language pair requester 316 of processing device 108 may include a user interface that permits a subscriber to request a language pair module from language pair request receiver 310 of processing device 106 via network 104. In one implementation, the subscriber may interact with language pair requester 316 of processing device 100 by using a remote control unit or processing device and viewing and selecting from a menu generated by processing device 100 onto a screen of television 102 or other multimedia device. In another implementation, the subscriber may interact with language pair requester 316 via buttons, a keyboard, or other input means connected to processing device 100.

Language pair requester 316 may communicate with language pair request receiver 310 of processing device 108 via network 104. Using language pair requester 316, a subscriber may be presented with a number of language pair modules from which to choose. Each language pair module may have an associated source language and an associated target language. For example, one language pair module may be associated with French as a source language and English as a target language and may be used to translate French text to English text.

Language pair request receiver 310 of processing device 106 may receive the language pair request from processing device 100 via network 104 and may inform account checker 308 of the request. Account checker 308 may access data storage repository 314, which may include an account database and may determine whether the subscriber is authorized to use the requested language pair and may update the subscriber's information in the account database, such as, for example, a fee to charge the requesting subscriber. The fee may be based, at least in part, on an amount of time the requested language pair module is to be available for use by the subscriber, a number of language pair modules to be made available to the subscriber, or particular ones of the language pair modules used by the subscriber. Other fee determination schemes may be used in other implementations. In some implementations, a subscriber may be charged a reduced fee or no fee in exchange for agreeing to receive commercial messages either on television 102 or other multimedia device or on processing device(s) 106.

Language pair request receiver 310 may inform language pair module downloader to load the requested language pair module to requesting processing device 100. Language pair module downloader 312 may then access data storage repository 314, which may include a number of language pair modules, each having an associated source language and an associated target language. Language pair module downloader 312 may then download the requested language pair module, via network 104, to processing device 100, where the language pair module may be installed for use with translation module 322.

Multimedia signal receiving component 318 of processing device 100 may receive a multimedia signal, such as, for example, a television signal, which may include information in a source language. The information in the source language may include, for example, text captioning, subtitles, speech, or other data. Information obtainer 320 may obtain the information from the television signal as text in the source language. In one implementation, information obtainer 320 may include an automatic speech recognizer (ASR), which may recognize speech in a source language in the multimedia signal and may produce corresponding text. In another implementation, information obtainer 320 may recognize text captioning in the multimedia signal and may produce the corresponding text. In yet another implementation, information obtainer may include an optical character recognizer (OCR) to perform character recognition on graphical characters, such as used for subtitles, to produce text. In an implementation in which information obtainer 320 includes an ASR, processor 108 may obtain a source language model for speech recognition from, for example, data repository 312, for downloading to the ASR included within information obtainer 320 of processing device 100.

Translation module 322 may translate the text in the source language to text in the target language. U.S. patent application Ser. No. 10/058,995, filed in the U.S. Patent and Trademark Office on Jan. 30, 2002, discloses a method, which may be used with implementations of the invention, for translating a source language to a target language. U.S. patent application Ser. No. 10/058,995 is incorporated by reference herein in its entirety.

Optional information provider 323 may receive the target language text as input and may change the text to another form. For example, in one embodiment, information provider 323 may include a speech generator for generating speech in the target language. In such an embodiment, processing device 108 may obtain a speech generation model from data storage repository 314 and may download the speech generation module to processing device 100 for use with information provider 323.

Information transmitter 326 may then transmit information, such as, for example, generated speech in the target language or the text in the target language to at least one of processing device(s) 106 via wireless, optical, wired, or other suitable means. Multimedia signal transmitter 326 may provide the multimedia signal to television 102 or another multimedia device. In an implementation in which information transmitter 326 transmits signals including generated speech, processing device(s) 106 may include a headset, speakers, an earphone, or the like, such that the subscriber may hear the generated speech. In an implementation in which information transmitter 326 transmits signals including text, processing device(s) 106 may include a display screen for displaying received text.

Further, in some implementations, processing device 100 may introduce a delay, such that the information is transmitted to processing device(s) 106 at an appropriate time with respect to the multimedia signal being transmitted to television 102 or another multimedia device.

As previously mentioned, in some implementations a subscriber may be charged a reduced fee or no fee for the on-demand language translation service in exchange for agreeing to receive commercial messages. In such implementations, commercial message retriever 315 may search a database of commercial messages for commercial messages that may be of interest to the subscriber based on the subscriber's account information. For example, commercial message retriever 315 may find commercial messages for local Italian restaurants for subscribers who have selected Italian as a target language, or commercial message retriever 315 may find commercial messages for kosher-style delicatessens for subscribers who have selected Hebrew as a target language.

Commercial message retriever 315 may transmit the selected one or more commercial messages, via network 104 to commercial message module 325 of processing device 100.

Commercial message module 325 may determine when one or more of the commercial messages are to be presented to the subscriber and may send the one or more commercial messages to translation module 322. Translation module 322 may determine whether the commercial message is already in the target language and, if not, may translate the one or more commercial messages to the target language. The one or more commercial messages may then be sent to information preparer 323 and information transmitter 326 for transmission to processing device 106, The one or more commercial messages may be presented to the subscriber via processing device 106 as text on a display or as generated speech.

FIG. 3A is a functional block diagram of an exemplary embodiment. Other embodiments may include more or fewer components. For example, in one embodiment, a group of processing devices 108 may be arranged in a server farm to serve multiple on demand translation requests from multiple subscribers. In another embodiment, processing device 100 may have multiple translation modules 322 and multiple information transmitters 326 for performing multiple translations and sending multiple translated information to processing devices 106. Thus, multiple viewers may be presented with translations in different target languages on their respective processing devices 106.

FIG. 3B illustrates a functional block diagram corresponding to a second embodiment 350 consistent with the principles of the invention. Exemplary second embodiment 350 may include processing device 108, processing device 100, network 104 and one or more processing devices 106 (not shown in FIG. 3B). Processing device 108 may include an account checker 308, a language pair module downloader 312, a translation module 322, a communication module 328, a data storage repository 314 and a commercial message retriever 315. Processing device 100 may include a multimedia signal receiving component 318, an information obtainer 320, a network communication module 321, an optional information preparer module 323, an information transmitter 326 and a multimedia signal transmitter 324.

Processing device 100 may be located locally with respect to television 102 and processing device(s) 106. Processing device 100 may be a device that receives a multimedia signal, such as, for example, a television signal and outputs the multimedia signal to television 102, or other multimedia device. Processing device 108 may be located remotely from television 102. Processing device 108 may have access to language pair modules for loading and installing to translation module 322. A subscriber may pay a periodic fee, such as monthly, weekly, semiannually, or another suitable time period for use of one or more language pair modules. Alternatively, the subscriber may be permitted use of the one or more language pair modules for a reduced fee or no fee in exchange for agreeing to receive commercial messages, which may be sent to television 102 or other multimedia device from processing device 100 or may be sent to processing device(s) 106 from processing device 100.

Communication module 328 may receive a translation request via network 104 from network communication module 321 of processing device 100 for translation services. Account checker 308 may access data storage repository 314, which may include an account database and may determine what language pair the subscriber is configured to use. Account checker 308 may update the subscriber's information in the account database, such as, for example, a fee to charge the requesting subscriber for use of the particular language pair module. The fee may be based, at least in part, on an amount of time the requested language pair module is to be available for use by the subscriber, a number of language pair modules to be made available to the subscriber, or particular ones of the language pair modules used by the subscriber. Other fee determination schemes may be used in other implementations. In some implementations, a subscriber may not be charged a fee or may be charges a reduced fee in exchange for agreeing to receive commercial messages either on television 102 or other multimedia device, or on processing device(s) 106.

Account checker 308 may inform language pair module downloader 312 to load and install the requested language pair module to translation module 322 of processing device 108. In some implementations, processing device 108 may include multiple translation modules 322 using respective language pair modules for various subscribers. Language pair module downloader 312 may access data storage repository 314, which may include a number of language pair modules, each having an associated source language and an associated target language. Language pair module downloader 312 may then load and install the language pair module to translation module 322.

Multimedia signal receiving component 318 of processing device 100 may receive a multimedia signal, such as, for example, a television signal, which may include information in a source language. The information in the source language may include, for example, text captioning, subtitles, speech, or other data. Information obtainer 320 may obtain the information from the television signal as text in the source language. In one implementation, information obtainer 320 may include an automatic speech recognizer (ASR), which may recognize speech in a source language in the multimedia signal and may produce corresponding text. In another implementation, information obtainer 320 may recognize text captioning in the multimedia signal and may produce the corresponding text. In yet another implementation, information obtainer may include an optical character recognizer (OCR) to perform character recognition on graphical characters, such as used for subtitles, to produce text. In an implementation in which information obtainer 320 includes an ASR, processor 108 may obtain a source language model for speech recognition from, for example, data repository 314, for downloading to the ASR included within information obtainer 320 of processing device 100.

Network communication module 321 may transmit information including the text in the source language to communication module 328 of processing device 108 via network 104. Translation module 322 may translate the text in the source language to text in the target language. After the text is translated by translation module 322 to the target language, communication module 328 may transmit the text in the target language, via network 104, to network communication module 321 of processing device 100.

Optional information provider 323 may receive the target language text as input from network communication module 321 and may change the text to another form. For example, in one embodiment, information provider 323 may include a speech generator for generating speech in the target language. In such an embodiment, processing device 108 may obtain a speech generation model from data storage repository 314 and may download the speech generation module to processing device 100 for use with information provider 323.

Information transmitter 326 may then transmit information, such as, for example, generated speech in the target language or the text in the target language to at least one of processing device(s) 106 via wireless, optical, wired, or other suitable means. Multimedia signal transmitter 324 may provide the multimedia signal to television 102, or other multimedia device. In an implementation in which information transmitter 326 transmits signals including generated speech, processing device(s) 106 may include a headset, speakers, an earphone, or the like, such that the subscriber may hear the generated speech. In an implementation in which information transmitter 326 transmits signals including text, processing device(s) 106 may include a display screen for displaying received text.

As previously mentioned, in some implementations a subscriber may be charged a reduced fee or no fee for the on-demand language translation service in exchange for agreeing to receive commercial messages. In such implementations, commercial message retriever 315 may search a database of commercial messages for commercial messages that may be of interest to the subscriber based on the subscriber's account information. For example, commercial message retriever 315 may find commercial messages for local French restaurants for subscribers who have selected French as a target language, or commercial message retriever 315 may find commercial messages for Chinese restaurants for subscribers who have selected a Chinese dialect as a target language.

Commercial message retriever 315 may transmit the selected one or more commercial messages, via network 104 to commercial message module 325 of processing device 100.

Commercial message module 325 may determine when one or more of the commercial messages are to be presented to the subscriber and may send the one or more commercial messages to network communication module 321. Network communication module 321 may determine whether the commercial message is already in the target language and, if not, may transmit the one or more commercial messages to translation module 322 for translation to the target language. The one or more commercial messages may then be sent to information preparer 323 and information transmitter 326 for transmission to processing device 106, The one or more commercial messages may be presented to the subscriber via processing device 106 as text on a display or as generated speech.

FIG. 3B is a functional block diagram of an exemplary embodiment. Other embodiments may include more or fewer components. For example, in one embodiment, a group of processing devices 108 may be arranged in a server farm to serve multiple on demand translation requests from multiple subscribers. In another embodiment, processing device 108 may have multiple translation modules 322 for performing multiple translations and processing device 100 may have multiple information transmitters 326 and for sending multiple translated information to processing devices 106. Thus, multiple viewers may be presented with translations in different target languages on their respective processing devices 106.

Exemplary Process

FIG. 4 is a flowchart of an exemplary process that may be used in implementations consistent with the principles of the invention. The process may begin by determining and charging a fee for use of the on-demand translation service (act 404). The fee may be charged on a periodic basis, such as, for example, monthly, weekly, semiannually, annually, or any other suitable periodic time period. In some implementations, a subscriber may not be charged a fee, or may be charged a reduced fee in exchange for agreeing to receiving commercial messages.

Next, multimedia signal receiving component 318 may receive a multimedia signal, such as, for example, a television signal that may include information in a source language (act 410). The information may include, for example, text captioning, subtitles, speech, or other data. Information obtainer 320 may obtain the information as text from the received television signal (act 412). For example, if the information is speech, information obtainer 320 may include an ASR for obtaining text from the speech. If the information is graphic information, such as, for example, subtitles, information obtainer 320 may include an optical character recognizer (OCR) for converting the graphic subtitles to text.

Translation module 322 may then translate the source language text to target language text (act 414). In embodiment 300 translation module may be included in processing device 100. In embodiment 350, network communication module 321 may receive the obtained text from information obtainer 320 and may transmit the text to communication module 328 of processing device 108. Translation module 322 of processing device 108 may translate the text to a target language and may pass the text back to communication module 328 for transmission to network communication module 321 via network 104.

Optional information preparer 323 may obtain the translated text from network communication module 321 and may change the text to a different form. In some implementations, information preparer 323 may include a speech generator and may convert the text to generated speech in the target language. Information transmitter 326 may then transmit the translated information to processing device(s) 106 (act 416). Multimedia signal transmitter 326 may send the multimedia signal to television 102 or other multimedia device, where the multimedia program may be viewed (act 418). Acts 410 through 418 may then be performed repeatedly.

Figure 5A:
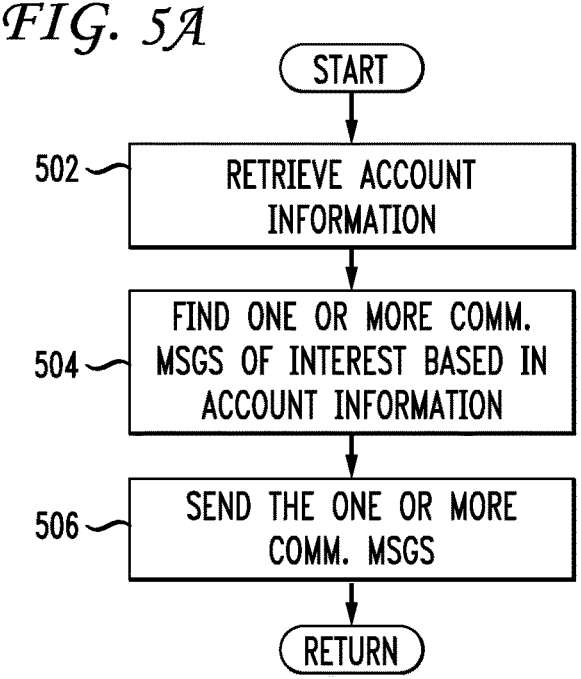

FIG. 5A is a flowchart that illustrates an exemplary process that may be performed in processing device 108 of embodiments 300 or 350. The process may begin with commercial message retriever 315 obtaining account information for a subscriber from an account database within data storage repository 314 (act 502). Commercial message retriever 315 may then search a commercial database within data storage repository 314 for commercial message that may be of interest to the subscriber based on account information, such as selected target language(s) or and/or address information (act 504). Commercial message retriever 315 may then transmit the one or more found commercial messages to commercial message module 325 via network 104 (act 506).

Figure 5B:
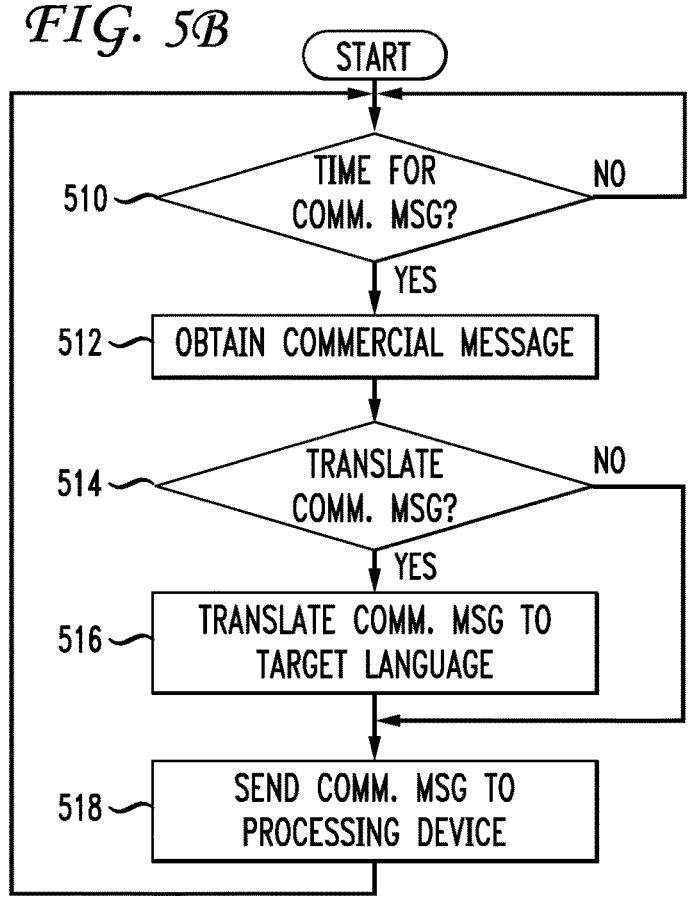

FIG. 5B is a flowchart that illustrates an exemplary process that may be performed in processing device 100 of embodiments 300 or 350, in which the exemplary process of FIG. 5A is also performed. The process may begin with commercial message module 325 determining whether one or more commercial messages are to be presented to the subscriber (act 510). Commercial message module 325 may determine that one or more commercial messages are to be presented periodically (for example, every 60 minutes, or another suitable time period), or may determine that one or more commercial messages may be presented at certain times during the day on certain days of the week, or some other criteria.

If commercial message module 325 determines that one or more commercial messages are to be presented, then commercial message module 325 may obtain the one or more commercial messages (act 512) and may provide the one or more commercial messages to translation module 322 (embodiment 300) or network communication module 321 (embodiment 350). Next, translation module 322 (embodiment 300) or network communication module 321 (embodiment 350) may determine whether the commercial message is already in the target language (act 514). This may be achieved by checking a language code included within the one or more commercial messages or by other means, such as, for example, matching words in the one or more commercial messages to words in a target language dictionary. If the one or more commercial messages are to be translated, then translation module 322 may perform the translation to produce target language text (embodiment 300) or network communication module 321 may transmit the one or more commercial messages to translation module 322 via network 104 for translation and may receive the translated text via network 104 (embodiment 350) (act 516).

Next, translation module 322 (embodiment 300) or network communication module 321 (embodiment 350) may provide the commercial message text in the target language to information preparer 323, which may change the translated text to another form, as previously discussed, which may then provide the one or more commercial messages to information transmitter 326 for transmission to processing device 106 and presentation to the subscriber (act 518). Acts 510 through 518 may then be repeated at a later time.

In accordance with the embodiments of FIGS. 3A and 3B, processing device 100 may store received multimedia signals in memory 230 and may look ahead to stored information received after the current multimedia signal being processed. Thus, processing device 100 may introduce a delay between the time a multimedia signal is received by processing device 100 and a time that the television signal is delivered to television 102 or other multimedia device.

CONCLUSION

The above-described embodiments are exemplary and are not limiting with respect to the scope of the invention. Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Further, in other implementations, hardwired logic may be used instead of processors, or one or more application specific integrated circuits (ASICs) may be used in implementations consistent with the principles of the invention. In addition, implementations consistent with the principles of the invention may have more or fewer acts than as described, or may implement acts in a different order than as shown. Accordingly, the appended claims and their legal equivalents should only define the invention, rather than any specific examples given.

We claim:

1. A method comprising:
receiving a message;
determining if text within the message is in a target language;
when the text is not in the target language:
translating, via a processor, the text to the target language, to yield translated text;
introducing, via the processor, a delay in a transmission of the message to yield a delayed message;
transmitting, via the processor, a media program to a first device; and
transmitting, via the processor, the delayed message with the translated text to a second device which is different from the first device, such that the translated text in the delayed message, when displayed on the second device, is displayed at an appropriate time relative to when the media program is displayed on the first device.

2. The method of claim 1, wherein the second device is a handheld device.

3. The method of claim 1, further comprising generating speech based on the translated text.

4. The method of claim 3, wherein the speech is output with the message.

5. The method of claim 1, wherein translating the text to the target language further comprises:
transmitting the text to a remote processing device via a network; and
receiving the translated text via the network from the remote processing device.

6. The method of claim 1, wherein a value of the message is based on a number of language pair modules used when performing the translating.

7. The method of claim 6, wherein the value corresponds to a fee.

8. The method of claim 1, further comprising offering, via a terminal, a user one of no fee and a reduced fee in exchange for agreeing to receive the message.

9. A system comprising:
a processor; and
a computer-readable storage medium having instructions stored which, when executed by the processor, cause the processor to perform operations comprising:
receiving a message;
determining if text within the message is in a target language;
when the text is not in the target language:
translating, via a processor, the text to the target language, to yield translated text;
introducing a delay in a transmission of the message to yield a delayed message;
transmitting, via the processor, a media program to a first device; and
transmitting, via the processor, the delayed message with the translated text to a second device which is different from the first device, such that the translated text in the delayed message, when displayed on the second device, is synchronized with the media program, is displayed at an appropriate time relative to when the media program is displayed on the first device.

10. The system of claim 9, wherein the second device is a handheld device.

11. The system of claim 9, the computer-readable storage medium having additional instructions stored which result in operations comprising generating speech based on the translated text.

12. The system of claim 11, wherein the speech is output with the message.

13. The system of claim 9, wherein translating the text to the target language further comprises:
transmitting the text to a remote processing device via a network; and
receiving the translated text via the network from the remote processing device.

14. The system of claim 9, wherein a value of the message is based on a number of language pair modules used when performing the translating.

15. The system of claim 14, wherein the value corresponds to a fee.

16. The system of claim 9, the computer-readable storage medium having additional instructions stored which result in operations comprising offering, via a terminal, a user one of no fee and a reduced fee in exchange for agreeing to receive the message.

17. A computer-readable storage device having instructions stored which, when executed by a processor, cause the processor to perform operations comprising:
receiving a message;
determining if text within the message is in a target language;
when the text is not in the target language:
translating, via a processor, the text to the target language, to yield translated text;
introducing a delay in a transmission of the message to yield a delayed message;
transmitting, via the processor, a media program to a first device; and
transmitting, via the processor, the delayed message with the translated text to a second device which is different from the first device, such that the translated text in the delayed message, when displayed on the second device, is displayed at an appropriate time relative to when the media program is displayed on the first device.

18. The computer-readable storage device of claim 17, wherein the second device is a handheld device.

19. The computer-readable storage device of claim 17, having additional instructions stored which result in operations comprising generating speech based on the translated text.

20. The computer-readable storage device of claim 19, wherein the speech is output with the message.

* * * * *